US008548959B2

(12) United States Patent
Wang

(10) Patent No.: US 8,548,959 B2
(45) Date of Patent: Oct. 1, 2013

(54) SYSTEM AND METHOD FOR MINIMIZING DATA RECOVERY WINDOW

(75) Inventor: Zhiye Wang, Beijing (CN)

(73) Assignee: CA, Inc., Islandia, NY (US)

( * ) Notice: Subject to any disclaimer, the term of this patent is extended or adjusted under 35 U.S.C. 154(b) by 75 days.

(21) Appl. No.: 12/955,528

(22) Filed: Nov. 29, 2010

(65) Prior Publication Data

US 2012/0136831 A1 May 31, 2012

(51) Int. Cl.
*G06F 17/00* (2006.01)

(52) U.S. Cl.
USPC ............................ 707/679; 707/685; 707/686

(58) Field of Classification Search
None
See application file for complete search history.

(56) References Cited

U.S. PATENT DOCUMENTS

| | | | |
|---|---|---|---|
| 6,513,051 B1 * | 1/2003 | Bolosky et al. ..................... | 1/1 |
| 7,197,520 B1 * | 3/2007 | Matthews et al. ..................... | 1/1 |
| 7,809,693 B2 * | 10/2010 | Lango et al. .................. | 707/679 |
| 8,127,095 B1 * | 2/2012 | Colgrove et al. ............. | 711/162 |
| 8,204,863 B2 * | 6/2012 | Sawdon et al. ............... | 707/679 |
| 8,375,005 B1 * | 2/2013 | Claudatos et al. ............. | 707/654 |
| 2004/0143563 A1 * | 7/2004 | Saake et al. ........................ | 707/1 |
| 2004/0267822 A1 * | 12/2004 | Curran et al. ................. | 707/200 |
| 2005/0021566 A1 * | 1/2005 | Mu ................................ | 707/200 |
| 2005/0177767 A1 * | 8/2005 | Furuya et al. .................... | 714/13 |
| 2007/0185934 A1 * | 8/2007 | Cannon et al. ................. | 707/204 |
| 2007/0271410 A1 * | 11/2007 | Shackelford .................... | 711/100 |
| 2009/0217085 A1 * | 8/2009 | Van Riel et al. ................... | 714/6 |
| 2010/0241618 A1 * | 9/2010 | Beatty et al. .................. | 707/679 |
| 2011/0125717 A1 * | 5/2011 | Manson ......................... | 707/679 |
| 2011/0246429 A1 * | 10/2011 | Prahlad et al. ................. | 707/679 |
| 2012/0005379 A1 * | 1/2012 | Dutch et al. ..................... | 710/31 |
| 2012/0324280 A1 | 12/2012 | Wang | |

OTHER PUBLICATIONS

"Self-Recovery in Server Programs," by Nagarajan et al. In: Proc. 2009 Int'l Symposium on Memory Management, pp. 49-58 (2009). Available at: ACM.*

* cited by examiner

*Primary Examiner* — Daniel Kinsaul
(74) *Attorney, Agent, or Firm* — Schwegman Lundberg & Woessner P.A.

(57) ABSTRACT

A computer-based system includes a backup server, a production server, a recovery agent that executes on the production server, a database on the production server, a backup database on the backup server, and a meta data file on the backup server. The meta data file includes file names, a file directory, and file attributes. The system is configured to copy the metadata file from the backup server to a production server. When the copying of the metadata file from the backup server to the production server is complete, and before or during a time period in which backup data is copied from the backup server to the production server, the system is configured to receive a request from the production server to restore a file from the backup server with a higher priority than other files on the backup server.

18 Claims, 5 Drawing Sheets

SYSTEM AND METHOD FOR MINIMIZING DATA RECOVERY WINDOW

TECHNICAL FIELD

The present disclosure relates to a system and method for data recovery, and in an embodiment, but not by way of limitation, a system and method for minimizing a data recovery window.

BACKGROUND

The amount of data in a typical enterprise environment is rapidly increasing. When the amount of data grows from several gigabytes to several terabytes, the backup window (i.e., the time that it takes to complete a backup of files) also increases. While this may be a challenge to an IT department, it is normally not a serious issue—after all, the system can still be up and running during a backup procedure. However, a serious challenge exists at recovery time. At recovery time, the data has been lost and consequently is not available to users of the system, and the users are waiting for the data to be restored and become available again. Consequently, the art would benefit from a system and method that permits backed up data to become available rather quickly.

SUMMARY

In an embodiment, a process includes maintaining on a backup server a metadata file comprising one or more of a file name, a file directory, and a file attribute. The metadata file is copied from the backup server to a production server. When the copying of the metadata file from the backup server to the production server is complete, and before or during a time period in which backup data is copied from the backup server to the production server, receiving a request from the production server to restore a file from the backup server with a higher priority than other files on the backup server.

In another embodiment, a system includes a backup server, a production server, a recovery processor configured to execute on the production server, a database on the production server, a backup database on the backup server, and a meta data file on the backup server. The meta data file includes one or more of a file name, a file directory, and a file attribute. The backup server, the production server, and/or the recovery processor are configured to copy the metadata file from the backup server to the production server. When the copying of the metadata file from the backup server to the production server is complete, and before or during a time period in which backup data is copied from the backup server to the production server, receiving a request from the production server to restore a file from the backup server with a higher priority than other files on the backup server.

In another embodiment, a computer readable medium includes instructions that when executed by a computer processor executes a process that includes maintaining on a backup server a metadata file comprising one or more of a file name, a file directory, and a file attribute, and copying the metadata file from the backup server to a production server. When the copying of the metadata file from the backup server to the production server is complete, and before or during a time period in which backup data is copied from the backup server to the production server, receiving a request from the production server to restore a file from the backup server with a higher priority than other files on the backup server.

DETAILED DESCRIPTION

Figure 1:
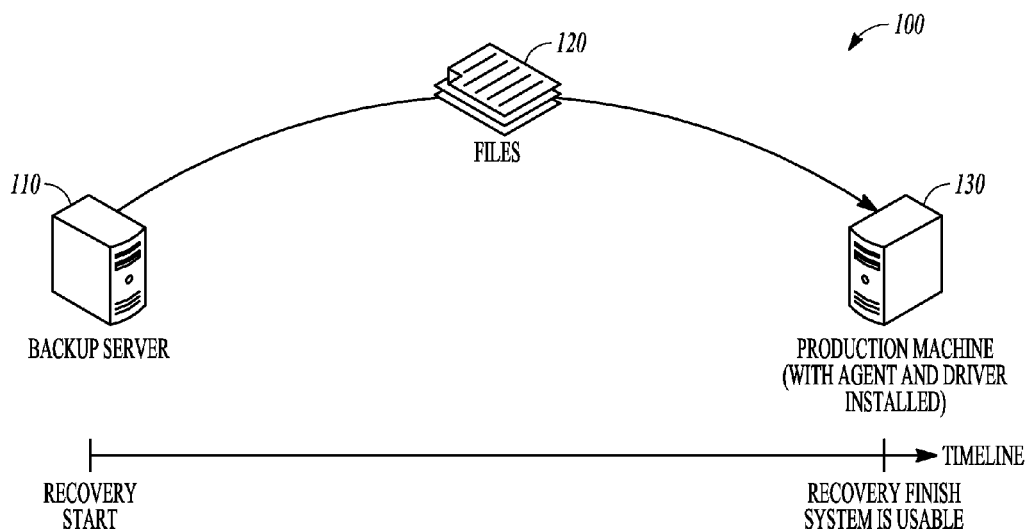
FIG. 1 is a diagram of a system for recovering backed up data.

One or more embodiments reduce a data recovery window from many hours to several minutes. These embodiments can be applied to virtually any system including UNIX/Linux and Windows systems.

In this disclosure, the term meta data is used to describe a collection of names for files and file directories (and their structures). These files, directories, and their locations have been backed up in a backup image on a backup server. The backup image of meta data can also include some file attributes (e.g., file permissions). Generally, the meta data is generated during backup time and is stored on the backup server. This meta data file is referred to as a "catalog file" by some of those of skill in the art.

In a Microsoft Windows® environment, a file or directory can contain a reparse point, which is a collection of user-defined data. The format of this data is understood by the application which stores the data, and a file system filter, which is installed to interpret the data and process the file. When an application sets a reparse point, it stores this data, plus a reparse tag. A reparse point tag is a number that identifies which file system filter driver should deal with a particular reparse point. A reparse point tag global unique identifier (GUID) is associated with a reparse point and can help on verifying whether the reparse point was created by a certain application. When the file system opens a file with a reparse point, it attempts to find the file system filter associated with the data format identified by the reparse tag. If a file system filter is found, the filter processes the file as directed by the reparse data. If a file system filter is not found, the file open operation fails.

For example, reparse points are used to implement the New Technology File System (NTFS) links and the Microsoft Remote Storage Server (RSS). The Microsoft RSS uses an administrator-defined set of rules to move infrequently used files to long term storage, such as tape or optical media. It uses reparse points to store information about the file in the file system. This information is stored in a stub file that contains a reparse point whose data points to the device where the actual file is now located. The file system filter can use this information to retrieve the file.

The following restrictions apply to reparse points. Reparse points can be established for a directory, but the directory must be empty. Otherwise, the NTFS file system fails to establish the reparse point. In addition, a user cannot create directories or files in a directory that contain a reparse point. Reparse points and extended attributes are mutually exclusive. The NTFS file system cannot create a reparse point when the file contains extended attributes, and it cannot create extended attributes on a file that contains a reparse point.

Each reparse point has an identifier tag so that one can efficiently differentiate between the different types of reparse points, without having to examine the user-defined data in the reparse point. The system uses a set of predefined tags and a range of tags reserved for Microsoft. If you use any of the reserved tags when setting a reparse point, the operation fails. Tags not included in these ranges are not reserved and are available for your application. When a reparse point is set, the data to be placed in the reparse point must be tagged. After the reparse point has been established, a new set operation fails if the tag for the new data does not match the tag for the existing data. If the tags match, the set operation overwrites the existing reparse point.

A usable state of a server refers to an application on a server that can run well and provide service to a client. The usable state further refers to a situation in which a user can access the files on the server. A data backup window is the amount of time that a backup process will take. A data recovery window is the amount of time that a recovery process will take.

FIG. 1 illustrates a typical prior art backup system 100. FIG. 1 illustrates a backup server 110 and a production machine 130. The production machine 130 can include a backup agent that is configured for handling data restoration. The data or files to be restored are stored on the backup server 110. Backup server 110 is responsible for sending the data or files 120 data to the agent on the production machine 130. The agent is responsible for receiving the data and storing it on the production machine 130. Generally, after a user selects the files 120 to be restored, the backup server 110 initiates a connection to the production machine 130 and restores the files in a serial fashion. The production machine 130 is recovered to usable state only after all files are completely restored.

Figure 2:
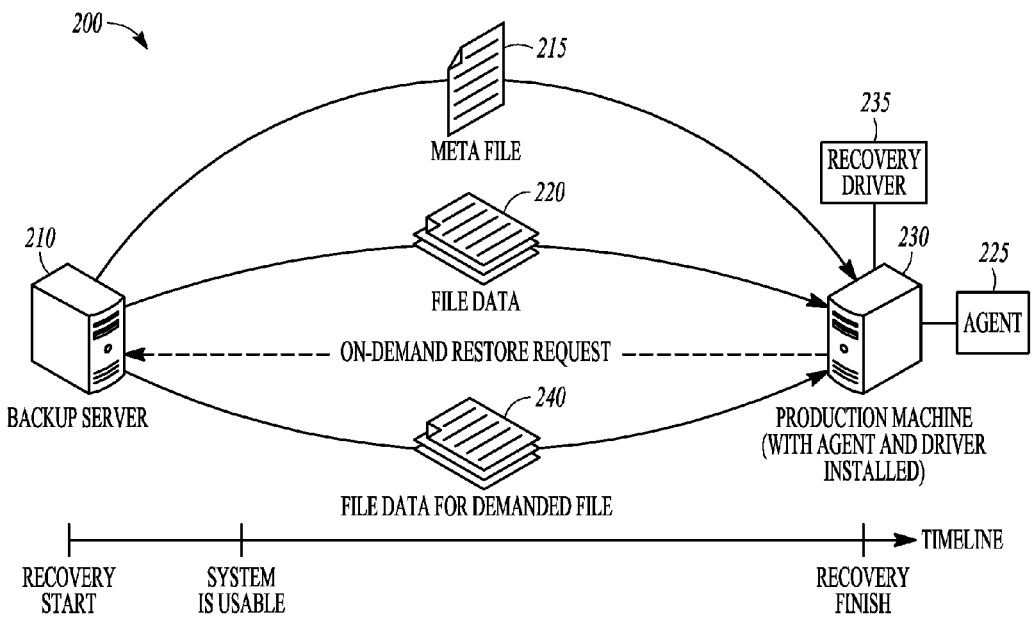
FIG. 2 is a diagram of another system for recovering backed up data.

FIG. 2 illustrates an embodiment of a backup system 200. The system 200 includes a backup server 210 and a production machine 230. The production server 230 includes an agent 225 and a recovery driver 235. In an embodiment, the backup server 210 and production machine 230 and agent 225 have all the functions of prior art backup methods. The system 200 further includes a metadata file 215 and file data 220. Through the interaction among the backup server 210, the production machine 230, and the recovery driver 235, the system 200 can make the files 220 available for access by users before their data is completely restored.

Figure 3:
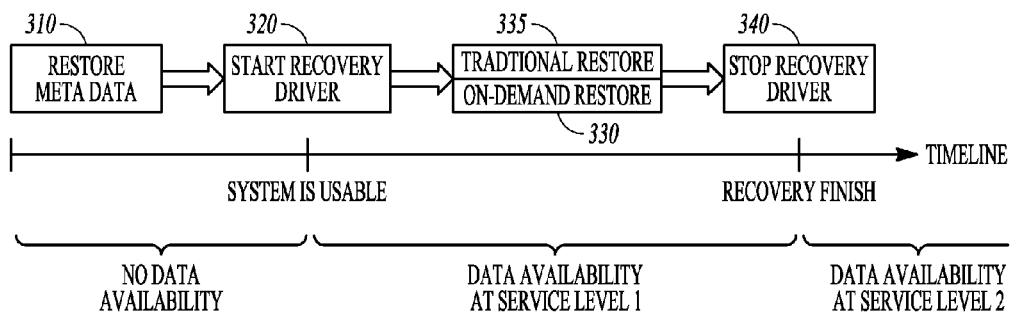
FIG. 3 is a timeline for recovering backed up data.

In an embodiment, as illustrated in FIG. 3, at 310, the backup server 210 will first restore the meta data 215 to the production machine 230. After all the meta data is restored, at 320, the agent 225 will start the recovery driver 235. At this time, the system goes into a usable state, wherein at 335 the system restores the data as in prior art methods. However, at 330, the agent 225 can initiate an on-demand restore request to restore certain files 240 in a priority fashion. After all file data is successfully restored, at 340, the agent 225 will halt the recovery driver 235. The recovery process is complete when the agent 225 halts the recovery agent 235.

As noted above, the system 200 goes into a usable state once the meta data 215 is restored. Because the meta data file size is far smaller than the size of the entire data set that is to be restored, the system 200 can go into usable state soon after the recovery is started; that is, before the recovery of the entire data set is finished. The system 200 is configured with two data availability service levels. At a first service level, which can be referred to as Service Level 1, wherein the meta data file 215 has been completely transferred to the production machine 230, all data files are available to be accessed by a user. However, the user may experience a delay when the data file that the user wants has not been fully transferred from the backup server 210 to the production machine 230. The amount of this delay will depend on the file size and the network speed. At a second service level, which can be referred to as Service Level 2, all files can be accessed in the same manner as before the need for the data file restoration occurred, since after the files are restored all files are once again on a local disk.

In the system 200, the backup server 210 will first restore meta data 215 to the agent 225 on the production machine 220. In restoring the meta data 215, the agent 225 will perform several steps. First, the agent 225 will create a directory of all the files to be restored (if such a directory does not already exist). The meta data file 215 is used by the agent 225 to create this directory. Second, the agent 225 creates an empty file for each file that is to be restored, and the agent 225 recovers the attributes of each file to be restored (e.g. file length, access permission, etc.). In an embodiment, such an empty file can be referred to as a "stub file." Third, in Windows® based systems, the agent 225 creates a reparse point in the stub file, and associates it with file location information for the file to be restored using the particular stub file. The Windows® operating system will call the recovery driver 235 based on the reparse point in the stub file. The file location information includes the offset where the file data is located on the backup media and its length. This information helps the backup server find the file data more quickly.

Once the meta data 215 is recovered, the agent 225 puts the recovery driver 235 into a running state, and as a result the production machine 230 goes into a usable state. At this point, all files (and directories) are present on the production machine 230. These files appear exactly as if they are there (i.e., the file size has correct value), with the exception that the files are all empty (i.e., no content). After that, the backup server 210 will continue to restore file data to the production machine 230 just like in prior art methods. Once the data for a file is restored, its associated reparse point will be removed.

In a Windows system environment, the recovery driver 235 can be a Windows mini filter file system driver. The recovery driver 235 monitors the Windows IO command "IRP_MJ_CREATE" for files associated with a specified reparse point tag. On Windows (and on other operating system as well), before accessing the content of a file, an application must open that file. The Windows operating system will internally initiate the command "IRP_MJ_CREATE" for any such "open request." If there is any mini filter driver registered to monitor this event, then the Windows IO Manager will call the driver's "Pre-Command function" (before the command is executed) and "post-Command function" (after the command is executed). The recovery driver 235 performs special work (discussed in detail below) in the post-command function.

Figure 4:
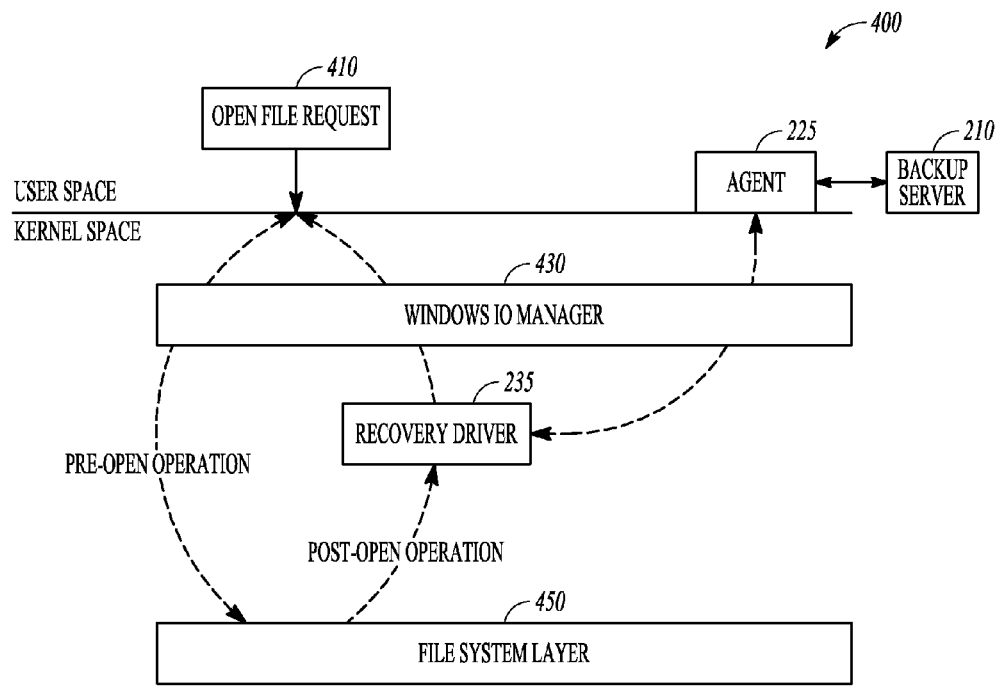
FIG. 4 is a diagram of a system process for recovering backed up data.

In a situation in which a stub file is accessed before its data is restored, the operating system generates an "open file" request and passes the request to the recovery driver 235. (FIG. 4, Nos. 410, 430, 235, 450). The recovery driver 235 blocks the access operation and initiates an on-demand file restore request to backup server 210. This request includes several steps. First, the recovery driver 235 checks several conditions. The recovery driver 235 checks to see if the stub file was created by the agent 225. This can be verified by checking the reparse point tag and the reparse point GUID. If the agent 225 did not create this stub file, the "open file" request is passed through so that it can be processed by another driver. The recovery driver 235 determines whether the request was initiated by the agent 225 by checking the current process ID. If the agent 225 associated with the recovery driver 235 is trying to open the file, the IO manager is informed that the file open operation is successful. If the file is in the process of being restored, that is, if the agent 225 is now restoring data for the file, the recovery driver 235 will block the current request until the restore is finished, and the recovery driver 235 will then request the IO manager 430 to reopen the file.

Figure 5:
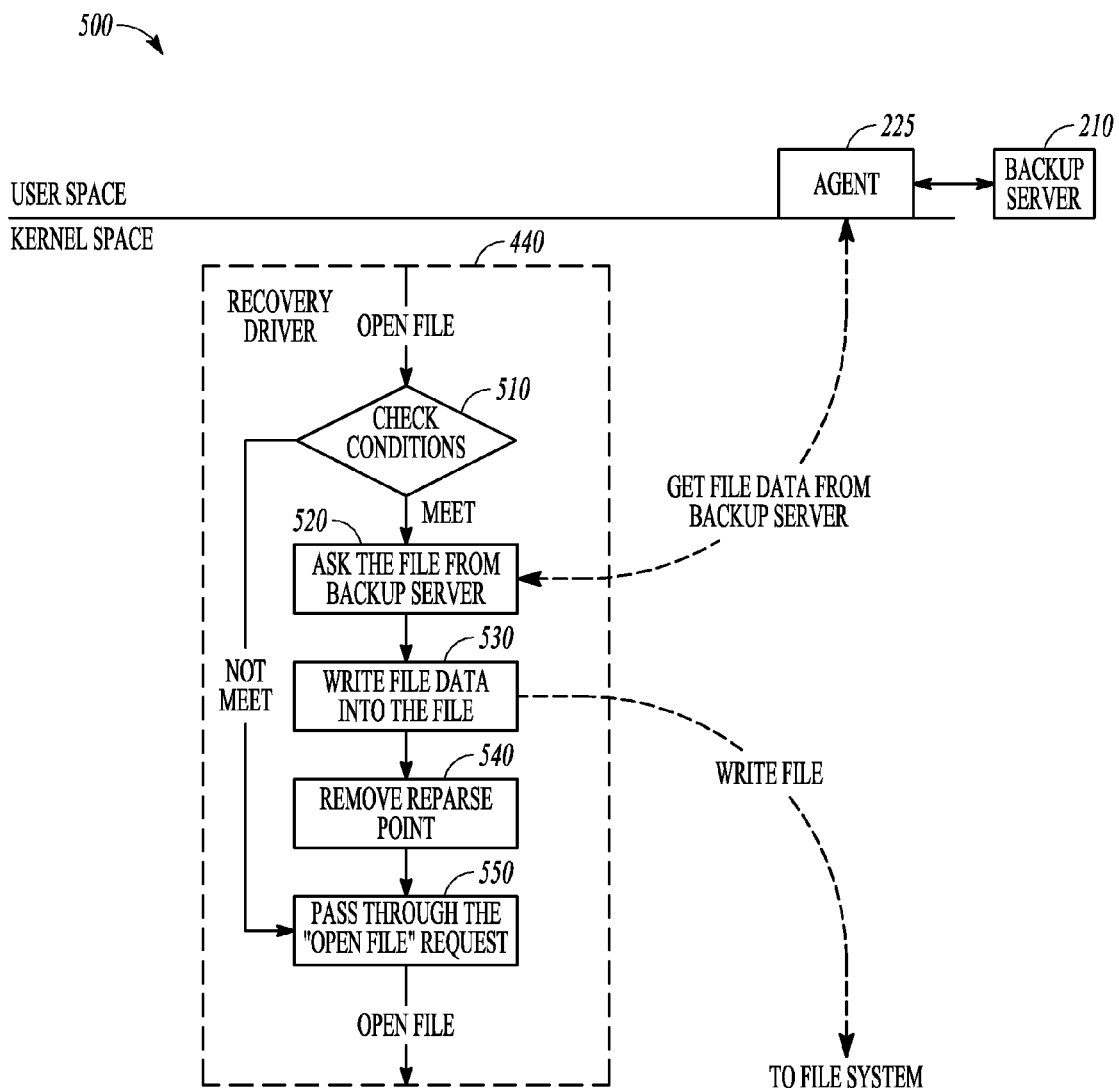
FIG. 5 is a diagram of another system process for recovering backed up data.

FIG. 5 illustrates at 510 that after the recovery driver 235 has checked the above several conditions, the recovery driver 235 extracts file location information from the stub file's reparse point tag data field and sends the information to the agent 225. The agent 225 in turn at 520 sends this information to the backup server 210 to request the data for the file and return the data to recovery driver 235. The recovery driver 235 opens the file (which will not be blocked by the driver itself), writes the data into the file at 530, and then closes the file. At 540, the recovery driver 235 removes the reparse point from the file once all file data is restored, and at 550, passes the operation through to the IO manager and informs the IO manager that the open operation was successful.

The process of the system 200 is transparent to a user or an application because, as illustrated in FIG. 4, it is executed in kernel space. Depending on the file size and the network speed, a user may experience some delay, but in most embodiments the delay is generally not significant. On the backup server side, once the backup server 210 has received an on-demand file restore request, the backup server 210 will attend to that request in a high priority fashion. The backup server 210 can quickly find the data for the file by using the location information received from the agent 225. The backup server 210 also keeps a list of files for such on-demand restore requests and makes sure they will not be restored again using a traditional restore method.

In an embodiment, the system 200 can minimize data recovery windows significantly. For example, in an enterprise environment where there is 1 terabyte of data, the meta data file size is about 100 MB (assuming an average file size of about 5 MB and an average full pathname length of about 512 bytes), and where the network speed is about 10 MB/s (e.g. a 1 gigabyte Ethernet network in a production environment, and ignoring the additional data transfer overhead and time for disk access), with traditional data recovery methods, the system becomes usable only after all data has been restored. Consequently, it will take about 29 hours to recovery the whole system. With the system 200 and related embodiments, the system becomes usable when the meta data is restored. Consequently, it can take as little as about 10 seconds to recover the whole system. Considering additional overhead (e.g., disk IO operation will consume extra time) in a production system, the numbers mentioned above may be somewhat different. However, the system 200 can clearly provide data availability far more quickly than a traditional method.

Figure 6:
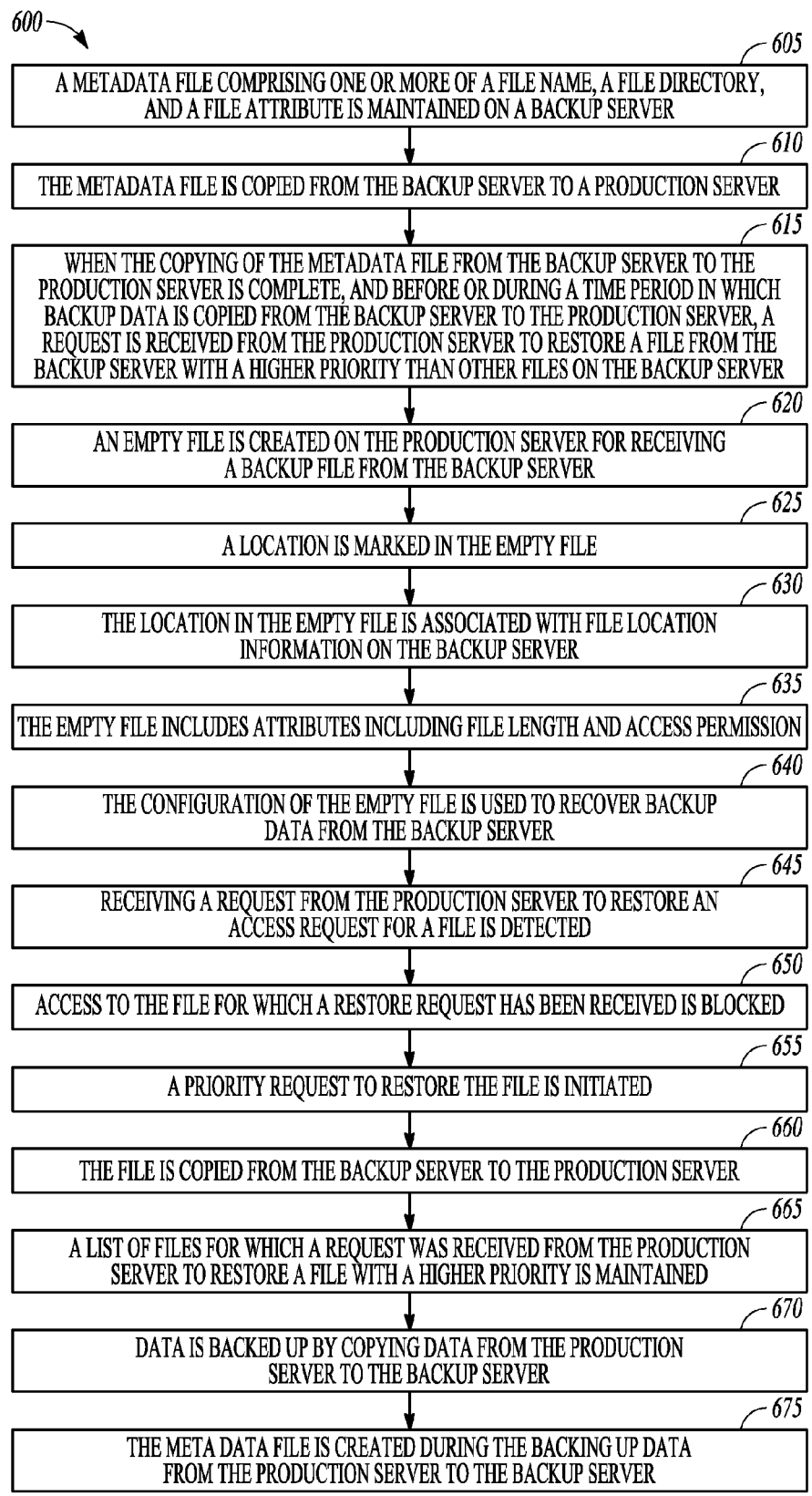
FIG. 6 is a flowchart of an example embodiment of a process to restore data from a backup server to a production server.

FIG. 6 is a flowchart of an example process 600 for managing a multi-layer network. FIG. 6 includes a number of process blocks 605-675. Though arranged serially in the example of FIG. 6, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIG. 6, at 605, a metadata file comprising one or more of a file name, a file directory, and a file attribute is maintained on a backup server. At 610, the metadata file is copied from the backup server to a production server. At 615, when the copying of the metadata file from the backup server to the production server is complete, and before or during a time period in which backup data is copied from the backup server to the production server, a request is received from the production server to restore a file from the backup server with a higher priority than other files on the backup server.

At 620, an empty file is created on the production server. The empty file is configured for receiving a backup file from the backup server. At 625, a location is marked in the empty file, and at 630, the location in the empty file is associated with file location information on the backup server. At 635, the empty file includes attributes including file length and access permission. At 640, the configuration of the empty file is used to recover backup data from the backup server.

The step of receiving a request from the production server to restore a file can include several steps. At 645, an access request for a file is detected, and at 650, access to the file for which a restore request has been received is blocked. At 655, a priority request to restore the file is initiated, and at 660, the file is copied from the backup server to the production server.

At 665, a list of files for which a request was received from the production server to restore a file with a higher priority is maintained. At 670, data is backed up by copying data from the production server to the backup server, and at 675, the meta data file is created during the backing up data from the production server to the backup server.

This method assumes the operating system is still running, and that the user wants to restore his/her data to the machine. In cases where the whole machine has become corrupted (i.e., the operating system itself also needs recovery), a user should first perform disaster recovery (DR) so that the operating system is booted, and then use one of the embodiments disclosed herein to recover data.

Figure 7:
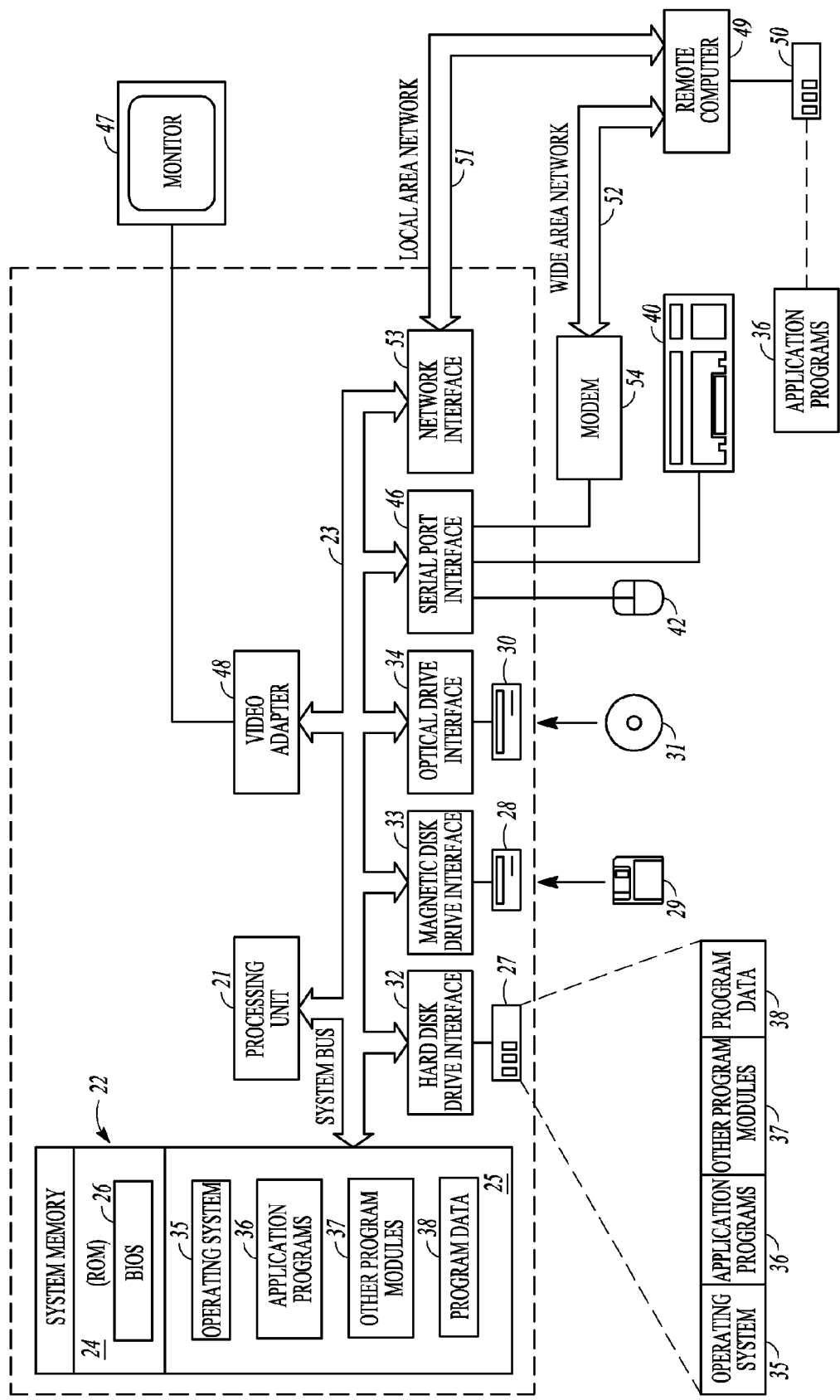
FIG. 7 is a block diagram of a computer system upon which one or more embodiments of the present disclosure can operate.

FIG. 7 is an overview diagram of a hardware and operating environment in conjunction with which embodiments of the invention may be practiced. The description of FIG. 7 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 7, a hardware and operating environment is provided that is applicable to any of the servers and/or remote clients shown in the other Figures.

As shown in FIG. 7, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 7 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Thus, an example system, method and machine readable medium for restoring backed up data have been described. Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

What is claimed is:

1. A process comprising:
   maintaining on a backup server a metadata file;
   copying all of the metadata file from the backup server to a production server before restoring backup data from the backup server to the production server;
   creating a directory of all files that are to be restored to the production server utilizing the metadata file;
   creating an empty file for each one of the files that are to be restored to the production server; and
   in response to an indication of a completion of the copying of the metadata file from the backup server to the production server, the production server goes into a useable state prior to the restoring of the backup data to the production server, and
   before or during a time period in which backup data is copied from the backup server to the empty file for each one of the files that are to be restored to the production server, receiving a request from the production server to restore a file from the backup server with a higher priority than other files on the backup server, and restoring the file with a higher priority than other files on the backup server; and
   maintaining a list of files for which a request was received from the production server to restore a file with a higher priority and preventing said files from being restored again using a traditional, serial restoration.

2. The process of claim 1, comprising:
   marking a location in the empty file; and
   associating the location in the empty file with file location information on the backup server.

3. The process of claim 2, wherein the empty file comprises attributes including file length and access permission.

4. The process of claim 2, comprising using the empty file to recover backup data from the backup server.

5. The process of claim 1, wherein the receiving a request from the production server to restore a file comprises:
   detecting an access request for the file;
   blocking access to the file;
   initiating a priority request to restore the file; and
   copying the file from the backup server to the production server.

6. The process of claim 1, comprising:
   backing up data by copying data from the production server to the backup server; and
   creating the meta data file during the backing up data from the production server to the backup server.

7. A system comprising:
   a backup server;
   a production server;
   a recovery processor configured to execute on the production server;
   a database on the production server;
   a backup database on the backup server; and
   a meta data file on the backup server;
   wherein one or more of the backup server, the production server, and the recovery processor are configured to:
   copy all of the metadata file from the backup server to a production server before restoring backup data from the backup server to the production server;
   create a directory of all files that are to be restored to the production server utilizing the metadata file;
   create an empty file for each of the files to be restored to the production server; and
   in response to an indication of a completion of the copying of the metadata file from the backup server to the production server, the production server goes into a useable state prior to the restoring of the backup data to the production server, and
   before or during a time period in which backup data is copied from the backup server to the empty file for each one of the files that are to be restored to the production server, receiving a request from the production server to restore a file from the backup server with a higher priority than other files on the backup server, and restoring the file with a higher priority than other files on the backup server; and
   maintaining a list of files for which a request was received from the production server to restore a file with a higher priority and preventing said files from being restored again using a traditional, serial restoration.

8. The system of claim 7, wherein the recovery processor is operable to check if the empty file was created by a first agent; and
   passing a request to open the empty file to a second agent when the first agent did not create the empty file.

9. The system of claim 8, wherein backup data from the backup server is written to the empty file, and wherein the production server is configured to remove the reparse points from the empty file.

10. The system of claim 7, wherein the backup server is configured to:
    receive a priority file restore request;
    locate the file data on the backup server using the file information received from the production server; and
    transmit the backup data to the production server.

11. The system of claim 7, wherein one or more of the backup server, the production server, and the recovery processor are configured to:
    detect an access request for the file;
    block access to the file;
    initiate a priority request to restore the file; and
    copy the file from the backup server to the production server.

12. The system of claim 7, wherein one or more of the backup server, the production server, and the recovery processor are configured to:
    back up data by copying data from the production server to the backup server; and
    create the meta data file during the backing up data from the production server to the backup server.

13. A non-transitory computer readable storage device storing instructions that when executed by a computer processor executes a process comprising:
    maintaining on a backup server a metadata file;
    copying all of the metadata file from the backup server to a production server before restoring backup data from the backup server to the production server;
    creating a directory of all files that are to be restored to the production server utilizing the metadata file;
    creating an empty file for each one of the files that are to be restored to the production server; and
    in response to an indication of a completion of the copying of the metadata file from the backup server to the production server, the production server goes into a useable state prior to the restoring of the backup data to the production server, and before or during a time period in which backup data is copied from the backup server to the empty file for each one of the files that are to be restored to the production server, receiving a request from the production server to restore a file from the backup server with a higher priority than other files on the backup server, and restoring the file with a higher priority than other files on the backup server; and maintaining a list of files for which a request was received from the production server to restore a file with a higher priority and preventing said files from being restored again using a traditional, serial restoration.

14. The non-transitory computer readable storage device of claim 13, comprising instructions for:

checking if the empty file was created by a first agent; and passing a request to open the empty file to a second agent when the first agent did not create the empty file.

15. The non-transitory computer readable storage device of claim 14, wherein the empty file comprises attributes including file length and access permission.

16. The non-transitory computer readable storage device of claim 14, comprising instructions for using the empty file to recover backup data from the backup server.

17. The non-transitory computer readable storage device of claim 13, wherein the instructions for receiving a request from the production server to restore a file comprises instructions for:

detecting an access request for that file;
blocking access to the file;
initiating a priority request to restore the file; and
copying the file from the backup server to the production server.

18. The non-transitory computer readable storage device of claim 15, comprising instructions for:

backing up data by copying data from the production server to the backup server; and creating the meta data file during the backing up data from the production server to the backup server.

* * * * *